(12) United States Patent
Tsang et al.

(10) Patent No.: US 8,473,520 B1
(45) Date of Patent: Jun. 25, 2013

(54) DELTA MEASURES

(75) Inventors: Ka Chun Tsang, Coquitlam (CA);
Seyyed Ali Moosavi, Vancouver (CA);
Yu-Hua Chou, Vancouver (CA); Finlay Cannon, Vancouver (CA)

(73) Assignee: Business Objects Software Limited, Dublin (IE)

(*) Notice: Subject to any disclaimer, the term of this patent is extended or adjusted under 35 U.S.C. 154(b) by 49 days.

(21) Appl. No.: 13/340,231

(22) Filed: Dec. 29, 2011

(51) Int. Cl.
*G06F 17/30* (2006.01)
(52) U.S. Cl.
USPC ............ 707/791; 707/802; 707/822; 707/828
(58) Field of Classification Search
USPC ................................................ 707/600–899
See application file for complete search history.

(56) References Cited

U.S. PATENT DOCUMENTS

2001/0054034 A1* 12/2001 Arning et al. .................... 707/1

* cited by examiner

*Primary Examiner* — Isaac M Woo
(74) *Attorney, Agent, or Firm* — Buckley, Maschoff & Talwalkar LLC

(57) ABSTRACT

A system may include reception of a selection of a set of one or more elements of a data visualization, the set associated with a measure and each of the one or more elements associated with a value of the measure for a respective combination of one or more dimension members, reception of an instruction to create a second set of one or more elements associated with a calculated measure, where a value of the calculated measure for a respective combination is based on two values of the measure for the respective combination, and where a first value of the two values of the measure is associated with a first time and a second value of the two values of the measure is associated with a second time, and automatic generation of a query to produce the value of the calculated measure for each of the combinations.

18 Claims, 11 Drawing Sheets

Analysis Application

| Data | Layout | Analysis 1 | |
|---|---|---|---|
| Adventure Works | Columns | Customer Geography | Measures Order Quantity |
| | | ⊞ All Customers | 60,398 |
| | | ⊞ Australia | 13,345 |
| | | ⊞ Canada | 7,620 |
| | | ⊞ France | 5,558 |
| | | ⊞ Germany | 5,625 |
| | | ⊞ United Kingdom | 6,906 |
| | | ⊞ United States | 21,344 |
| | Rows | | |
| 320 | 330 | | 310 |

*FIG. 3*

Analysis Application

| Data | Layout | | | |
|---|---|---|---|---|
| Adventure Works | Columns | | | |
| | | Analysis 1 | | |
| | | | Measures | |
| | | Customer Geography | Order Quantity | Percentage Δ |
| | | ⊞ All Customers | 60,398 | +12.26 % |
| | | ⊞ Australia | 13,345 | -30.36 % |
| | | ⊞ Canada | 7,620 | +17.12 % |
| | | ⊞ France | 5,558 | +33.48 % |
| | | ⊞ Germany | 5,625 | +18.78 % |
| | | ⊞ United Kingdom | 6,906 | -22.16 % |
| | | ⊞ United States | 21,344 | -11.56 % |
| | Rows | | | |

Δ [Last 24 Hours ▼] — 510

Analysis Application

| Data | Layout | Analysis 1 | | |
|---|---|---|---|---|
| Adventure Works | Columns | | Measures | |
| | | Customer Geography | Order Quantity | Percentage ∆ |
| | | ⊞ All Customers | 60,398 | +1.36 % |
| | | ⊞ Australia | 13,345 | −50.56 % |
| | | ⊞ Canada | 7,620 | +34.12 % |
| | | ⊞ France | 5,558 | +13.34 % |
| | Rows | ⊞ Germany | 5,625 | +28.58 % |
| | | ⊞ United Kingdom | 6,906 | −20.36 % |
| | | ⊞ United States | 21,344 | +3.56 % |

∆ | Last 3 Days | ▶

*FIG. 6*

| Analysis Application | | | | | | |
|---|---|---|---|---|---|---|
| Data | Layout | Analysis 1 | | | | |
| Adventure Works | Columns | | | Measures Order Quantity | Percentage Δ | Value Δ | Last Week ▼ |
| | | Customer Geography | | | | |
| | | ⊞ All Customers | | 60,398 | +1.36 % | +8177 |
| | | ⊞ Australia | | 13,345 | -50.56 % | -2847 |
| | | ⊞ Canada | | 7,620 | +34.12 % | +1255 |
| | | ⊞ France | | 5,558 | +13.34 % | +1637 |
| | | ⊞ Germany | | 5,625 | +28.58 % | -1542 |
| | Rows | ⊞ United Kingdom | | 6,906 | -20.36 % | +952 |
| | | ⊞ United States | | 21,344 | +3.56 % | +7607 |

*FIG. 10*

DELTA MEASURES

FIELD

Some embodiments relate to data analysis systems. More specifically, some embodiments relate to systems for creating analytical views.

BACKGROUND

Enterprise software systems receive, generate and store data related to many aspects of a business enterprise. Due to the volume of data, the variety of data, and the speed with which the data accumulates, intermediate systems are required to facilitate users' access to and understanding of the data.

These systems may provide reporting, planning and/or analysis of underlying data. In one example, a user requests a report showing sales per month for a particular sales region. In another example, a user requests a sales plan which is fully or partially-populated based on underlying data. Some systems allow a user to customize such a report or plan, as well as to generate a new report, plan, or other view.

Such customization or generation might not be intuitive to a typical business user. Even if a user is adept at creating new views, these views normally include measure values associated with various combinations of dimension members, and simple values calculated based on the measure values (e.g., totals, etc.). In order to include more sophisticated analysis of the underlying measure values, the user is typically required to author a query (e.g., MDX or SQL) of the underlying data source. The skill set of the typical business user does not include this capability.

Accordingly, systems are desired to facilitate the inclusion of useful analytical information within user-generated views.

BRIEF DESCRIPTION OF THE DRAWINGS

FIG. 3 is a view of a user interface according to some embodiments.

FIG. 5 is a view of a user interface according to some embodiments.

FIG. 6 is a view of a user interface according to some embodiments.

FIG. 10 is a flow diagram of a process according to some embodiments.

DETAILED DESCRIPTION

Figure 1:
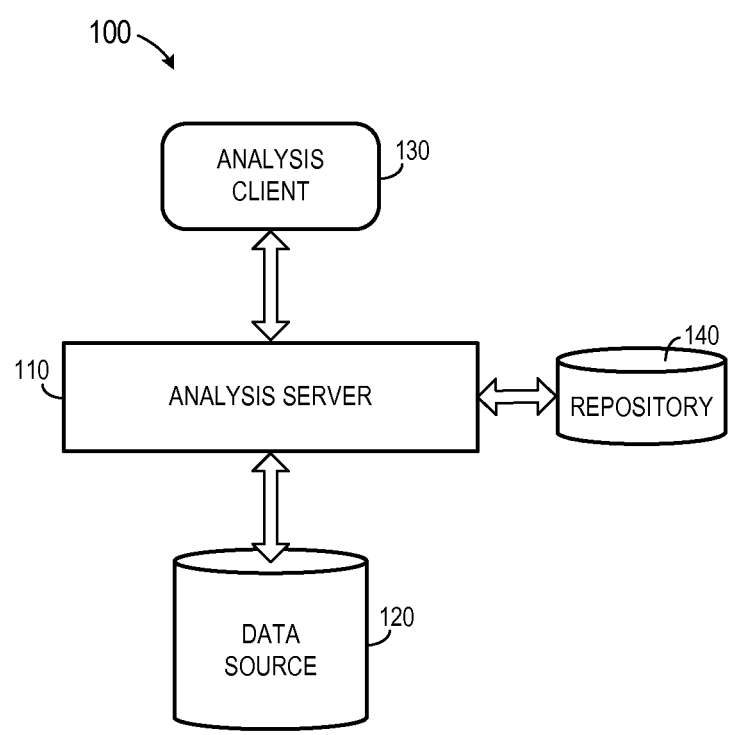
FIG. 1 is a block diagram of a system according to some embodiments.

FIG. 1 is a block diagram of system 100 according to some embodiments. FIG. 1 represents a logical architecture for describing processes according to some embodiments, and actual implementations may include more or different components arranged in other manners.

System 100 includes analysis server 110 to provide data of data source 120 to analysis client 130. For example, analysis server 110 may receive a request for one or more dimensions and measures from analysis client 130, query data source 120 for dimension members and associated measure values, receive the members and values from data source 120, and return the information to analysis client 130.

Data source 120 may comprise any one or more systems to store data and provide the data in response to suitable queries. The data stored in data source 120 may be received from disparate hardware and software systems, some of which are not interoperational with one another. The systems may comprise a back-end data environment employed in a business or industrial context. The data may be pushed to data source 120 and/or provided in response to queries received therefrom.

The data of data source 120 may be stored in traditional fixed disks or in-memory (e.g., in Random Access Memory) to allow fast retrieval and processing thereof. The data may comprise a relational database, an in-memory database, a multi-dimensional database, an eXtendable Markup Language (XML) document, and/or any other structured data storage system. Analysis server 110 queries data source 120 based on the query language supported by data source 120 (or by an intermediate data provider disposed between server 110 and data source 120). For example, analysis server 110 generates and transmits Multi-Dimensional eXpression (MDX) queries in a case that data source 120 is an OnLine Analytical Processing (OLAP) cube.

To provide economies of scale, data source 120 may include data of more than one customer. In this scenario, analysis server 110 includes mechanisms to ensure that a client accesses only the data that the client is authorized to access. Moreover, the data of data source 120 may be indexed and/or selectively replicated in an index.

Analysis client 130 displays user interfaces and data received from analysis server 110, and may also be operated to process such data and send data back to analysis server 110 for storage in data source 120. Analysis client 130 may comprise any suitable device, such as a desktop computer, a laptop computer, a personal digital assistant, a tablet PC, and a smartphone. Analysis client 130 may execute program code of a data analysis (e.g., spreadsheet) application, a data analysis application with a plug-in allowing communication (e.g. via Web Services) with analysis server 110, a rich client application (e.g., a Business Intelligence tool), an applet in a Web browser, or any other application to perform the processes attributed thereto herein.

Repository 140 stores metadata and data for use by analysis server 110. The metadata may specify a schema of data source 120, which may be used by analysis server 110 to query data source 120. Repository 140 may also store metadata defining reports and instance data of the reports.

Although system 100 has been described as a distributed system, system 100 may be implemented in some embodiments by a single computing device. For example, both analysis client 130 and analysis server 110 may be embodied by an application executed by a processor of a desktop computer, and data source 120 may be embodied by a fixed disk drive within the desktop computer.

Figure 2:
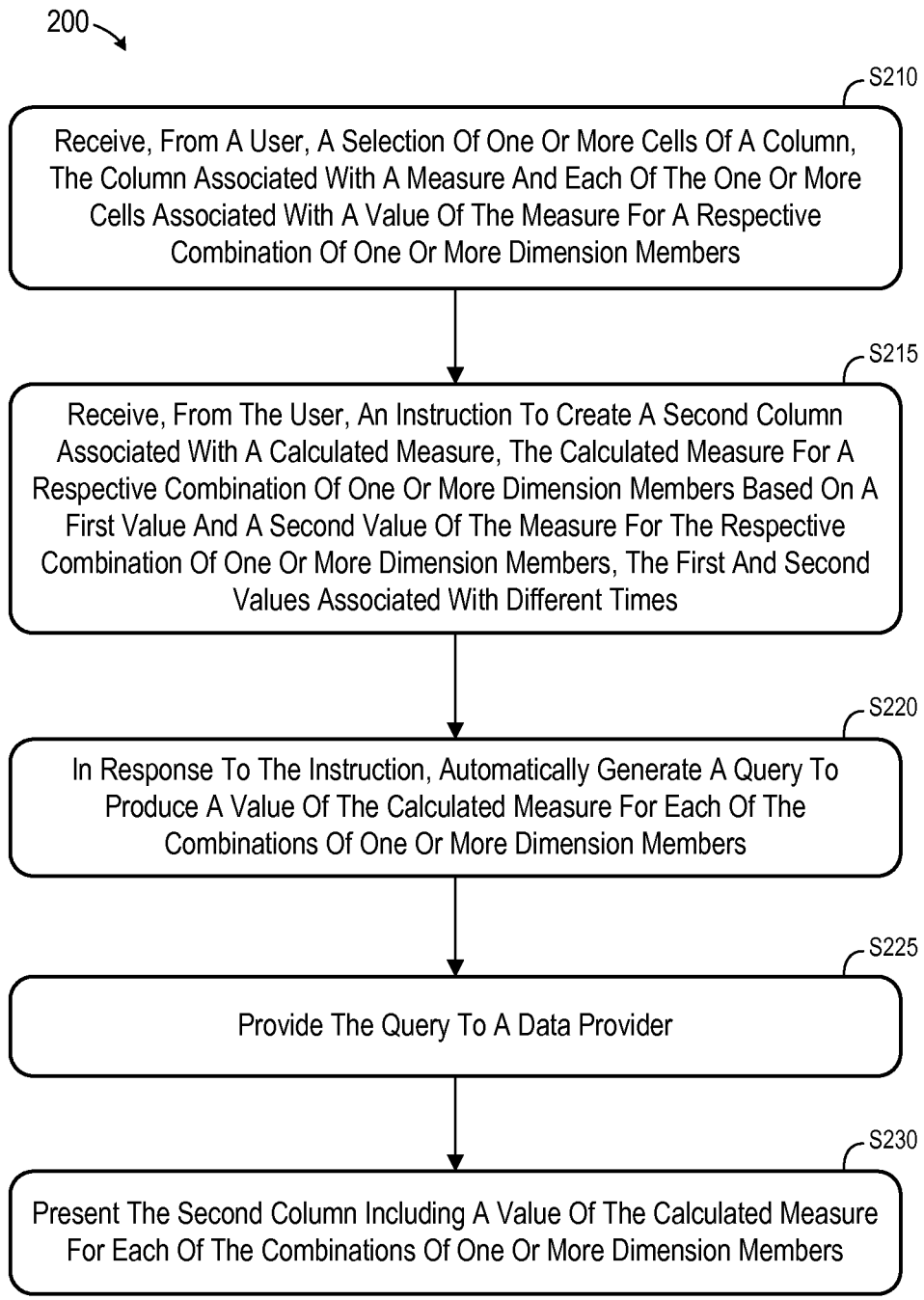
FIG. 2 is a flow diagram of a process according to some embodiments.

FIG. 2 comprises flow diagram of process 200 according to some embodiments. In some embodiments, various hardware elements of system 100 execute program code to perform process 200. In some embodiments, hard-wired circuitry may be used in place of, or in combination with, program code for implementation of processes according to some embodiments. Embodiments are therefore not limited to any specific combination of hardware and software.

Prior to S210, a user operates analysis client 130 to receive a result set from analysis server 110. To assist in the present description of an example of process 200, FIG. 3 shows a view of user interface 300 according to some embodiments. User interface 300 may be presented on a display of analysis client 130 in response to execution of a Business Intelligence tool (e.g., Analysis Application) by a processor of client 130. Alternatively, user interface 300 may be a Web page displayed by a Web browser application executed by the processor. Embodiments are not limited to these examples.

According to the present example, it will be assumed that a user has manipulated user interface 300 to display visualization 310 at S210. Visualization 310 includes a list of dimensions and members logically arranged in a hierarchically ordering. Visualization 310 is a table according to the illustrated embodiment, and may be generated by a spreadsheet application. Any type of visualization may be employed in conjunction with some embodiments.

For example, the visualization may be a cross-tabulation (i.e., cross-tab). A cross-tab is a visualization of data that displays the joint distribution of two or more variables simultaneously. Cross-tabs are usually presented in a matrix format. Each cell of a cross-tab shows a value (e.g., Sales) associated with the specific combination of row (e.g., U.S.) and column (e.g., 2010) headings.

Visualization 310 may be retrieved using any querying/reporting/analysis paradigm that is or becomes known according to some embodiments. In some examples, the user drags and drops one or more dimensions from a list within data window 320 into layout window 330. For clarity, such a list is omitted from FIG. 3. By convention, the selected dimension in visualization 310 is called an axis. In some examples, the user drags and drops one or more members, measures, or calculated values into layout window 330.

Visualization 310 is associated with a Customer Geography dimension and with an Order Quantity measure, but embodiments are not limited to one dimension or to one measure. Visualization 310 also includes members of the Customer Geography dimension and, for each member, a value for each of the Order Quantity measure.

The present example assumes that the user wishes to evaluate the value of the Order Quantity measure with respect to one or more prior values of the measure for each of the displayed dimension members. Conventional systems do not allow the user to efficiently modify the structure of visualization 310 in order to support this evaluation.

Turning to process 200, a selection of one or more cells of a column is received from the user at S210. The column is associated with a measure, and each of the one or more selected cells is associated with a value of the measure for a respective combination of one or more dimension members. Embodiments are not limited to the selection of columns and/or cells in a tabular format. Rather, S210 merely requires the selection of a set of one or more visual elements, each one of which is associated with a value of the measure for a respective combination of one or more dimension members.

Figure 4:
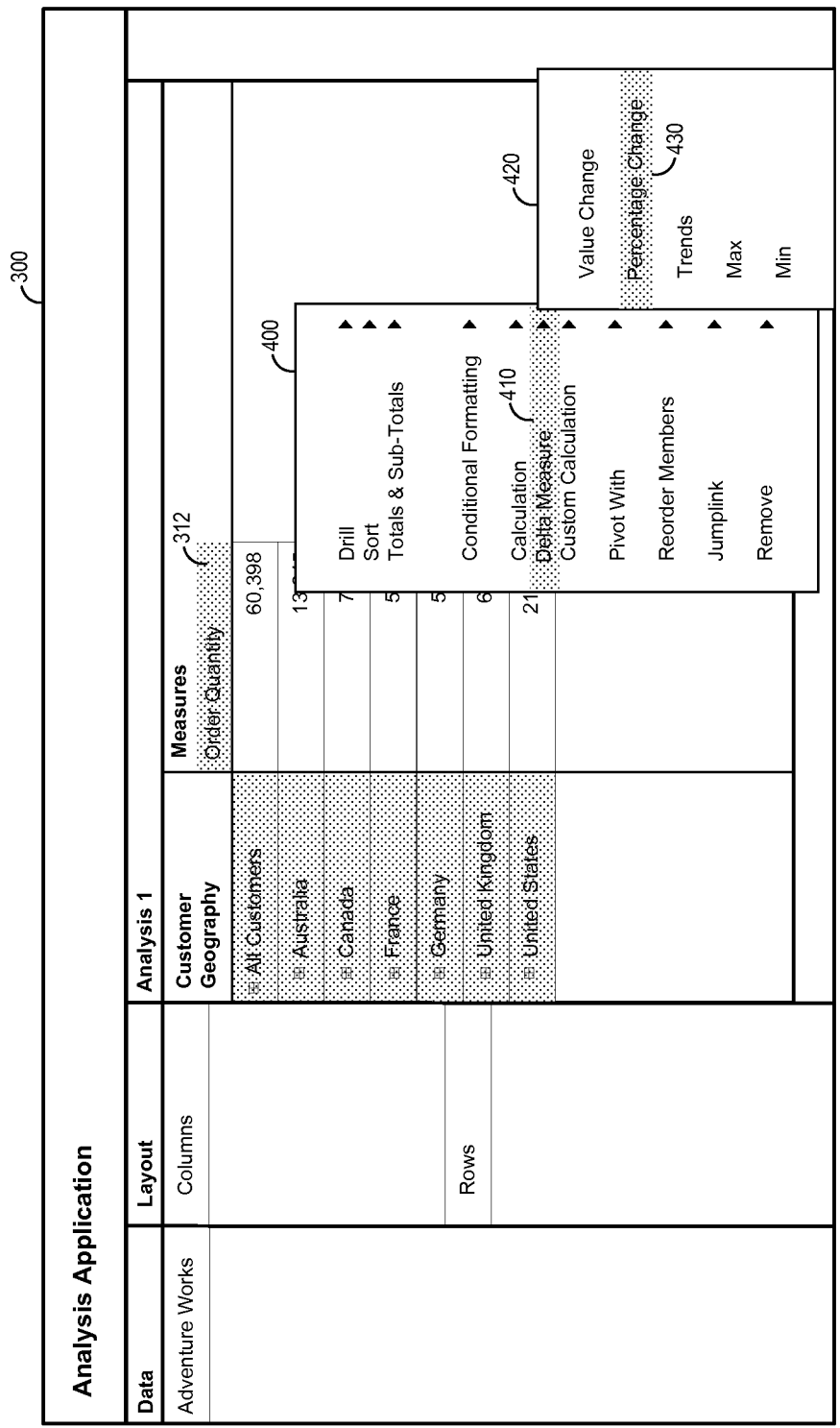
FIG. 4 is a view of a user interface according to some embodiments.

FIG. 4 illustrates such a selection according to some embodiments. As indicated by shading, column 312 has been selected. Column 312 is associated with the Order Quantity measure, and each cell of column 312 is associated with a value of this measure for a respective member of the Customer Geography dimension. If another one or more dimensions and associated members were included in visualization 310, each of the selected cells would be associated with a value of the Order Quantity measure for each respective combination of the dimension members (i.e., for each "row" of visualization 310).

Next, at S215, an instruction is received from the user to create a second column associated with a calculated measure. FIG. 4 also depicts this instruction according to some embodiments. More specifically, the user has "right-clicked" (or the equivalent for the interface in an implementation of client 130, such as control-click) on column 312, resulting in display of context menu 400. The user has selected "Delta Measure" option 410, resulting in display of sub-menu 420, and has selected Percentage Change measure 430 as the calculated measure to associate with the second column. Again, embodiments are not limited to "columns", and 5215 may generally comprise receiving an instruction to create a second set of one or more elements associated with a calculated measure.

Sub-menu 420 presents several calculated measures that may be associated with the new column. For each calculated measure of sub-menu 420, its value is calculated based on at least two values of the measure selected at S210 (e.g., Order Quantity). A first value of the two values is associated with a first time and a second value of the two values is associated with a second time. For example, a value of Percentage Change measure 430 may be calculated based on a current value of the Order Quantity measure and on a prior value of the Order Quantity measure. The difference between the first time and the second time may initially be a default value, as will be described below.

A query is automatically generated at S220 in response to the received instruction. The query is intended to produce a value of the calculated measure for each of the combinations of dimension members (i.e., rows) of the selected cells. As mentioned above, the format of the query depends on the data source. In one example, the data source is an OLAP cube and analysis server 110 automatically generates the following MDX query at S220 in response to the selection of Percentage Change measure 430:

WITH MEMBER delta AS
    (([Measures].[Internet Order Quantity], [Date].[Fiscal].[Date].&[Mar. 3, 2004])-([Measures].[Internet Order Quantity], [Date].[Fiscal].[Date].&[Mar. 2, 2004]))/([Measures].[Internet Order Quantity], [Date].[Fiscal].[Date].&[Mar. 2, 2004]),
FORMAT_STRING="percent"
SELECT
    {[Measures].[Internet Order Quantity], delta} ON 0,
    DrilldownLevel([Customer].[Customer Geography]) ON 1
FROM [Adventure Works];

The above query assumes that the current date is Mar. 3, 2004 and that the measure should be calculated with respect to the Order Quantity measure of the prior day, Mar. 2, 2004. Accordingly, the default difference between the time associated with the first and second measure values is 24 hours.

The above query also assumes that the OLAP cube includes a time-based dimension. Such a dimension may be detected automatically from the cube metadata, or configured manually by an administrator (e.g., in case the cube includes multiple time dimensions, such as Calendar and Fiscal Year).

In some embodiments, the data source implements methods for discovering and querying for data changes, and also stores historical versions of the data internally. In such an embodiment, the query generated at S220 may simply identify the original measure (i.e., the Order Quantity measure), the calculated measure (i.e., Percentage Change), and the time period over which the calculated measure is to be calculated.

The query is provided to a data provider of the data source at S225 and a result set is received. The result set may include a value of the calculated measure for each of the combinations of dimension members of the selected cells. In some embodiments, the result set includes the current value of the selected measure (i.e., the Order Quantity measure) and a prior value of the selected measure for each of the combinations of dimension members, and analysis server 110 calculates the values of the calculated measure based thereon.

The second column is presented at S230. The second column includes a value of the calculated measure for each of the combinations of one or more dimension members (i.e., rows). FIG. 5 illustrates presentation of column 500 according to some embodiments of S230. As shown, column 500 includes, for each row of visualization 310, a value of the Percentage Change measure. FIG. 5 also displays time period menu 510, which indicates the time period over which the values of the calculated measure were calculated.

The default time period may be changed on-the-fly by manipulating time period menu 510. FIG. 6 depicts a scenario in which the user has changed the default time period from 24 hours to 3 days. In response, S220 through S230 are again executed with respect to the new time period. Accordingly, the values of the Percentage Change measure presented in column 500 are changed to reflect the newly-calculated values.

Figure 7:
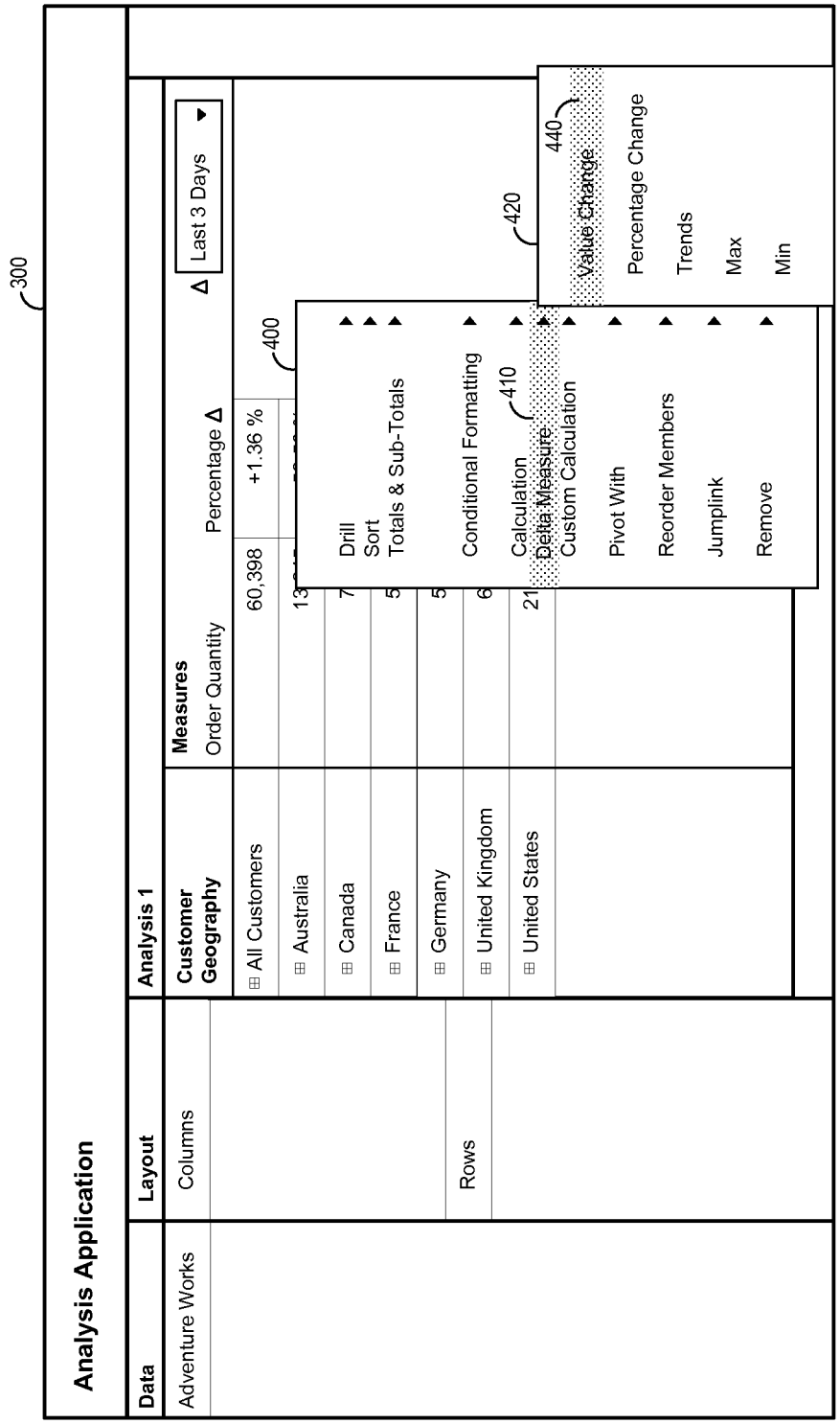
FIG. 7 is a view of a user interface according to some embodiments.

In some embodiments, S215 through S230 may be repeated to add another calculated measure to visualization 310. For example, FIG. 7 illustrates receipt of an instruction to create a column associated with another calculated measure at S215. The user has again "right-clicked" on column 312 to display context menu 400, and has selected "Delta Measure" option 410 to display sub-menu 420. The user has further selected Value Change measure 440 as the calculated measure to associate with the new column.

Figure 8:
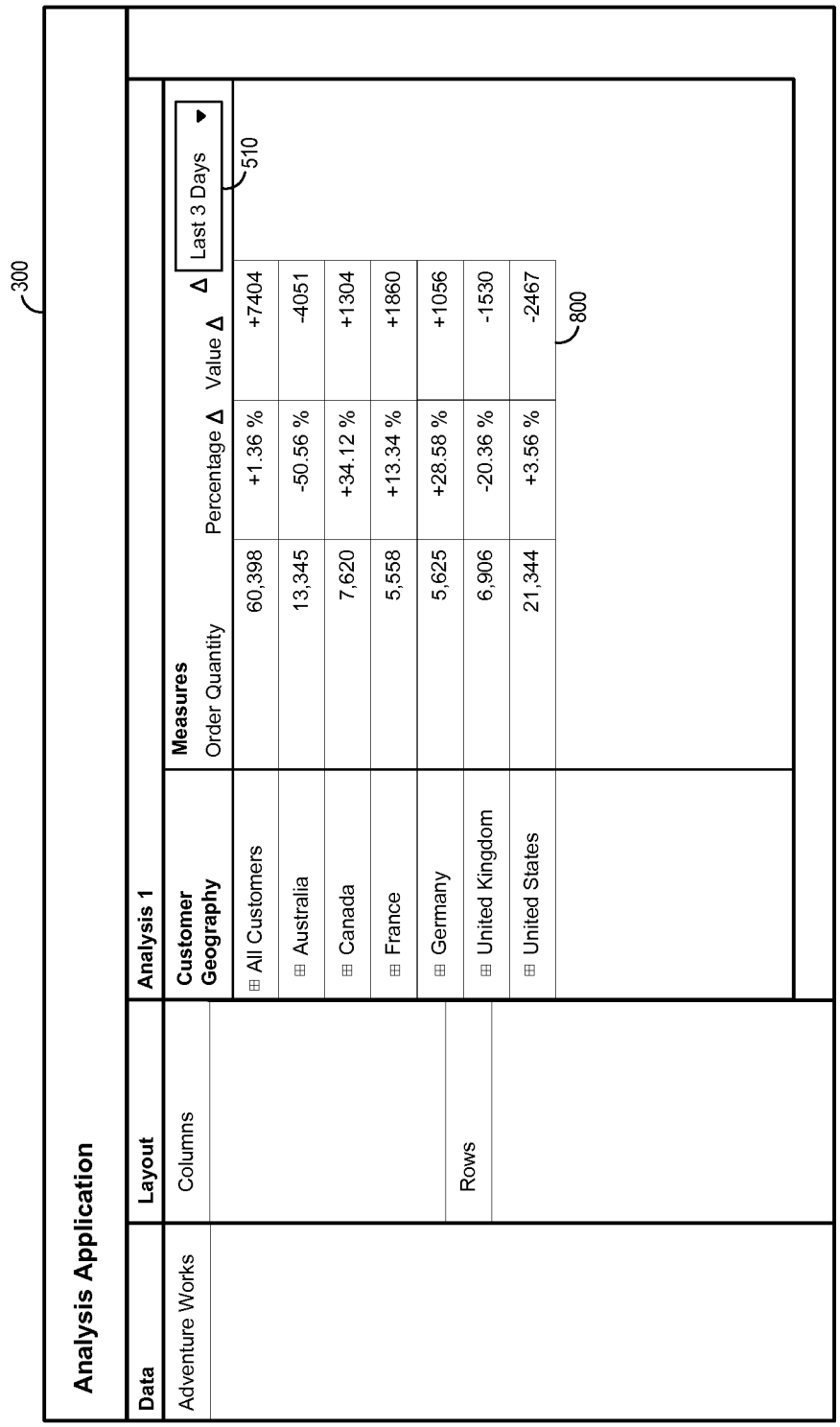
FIG. 8 is a view of a user interface according to some embodiments.
Figure 9:
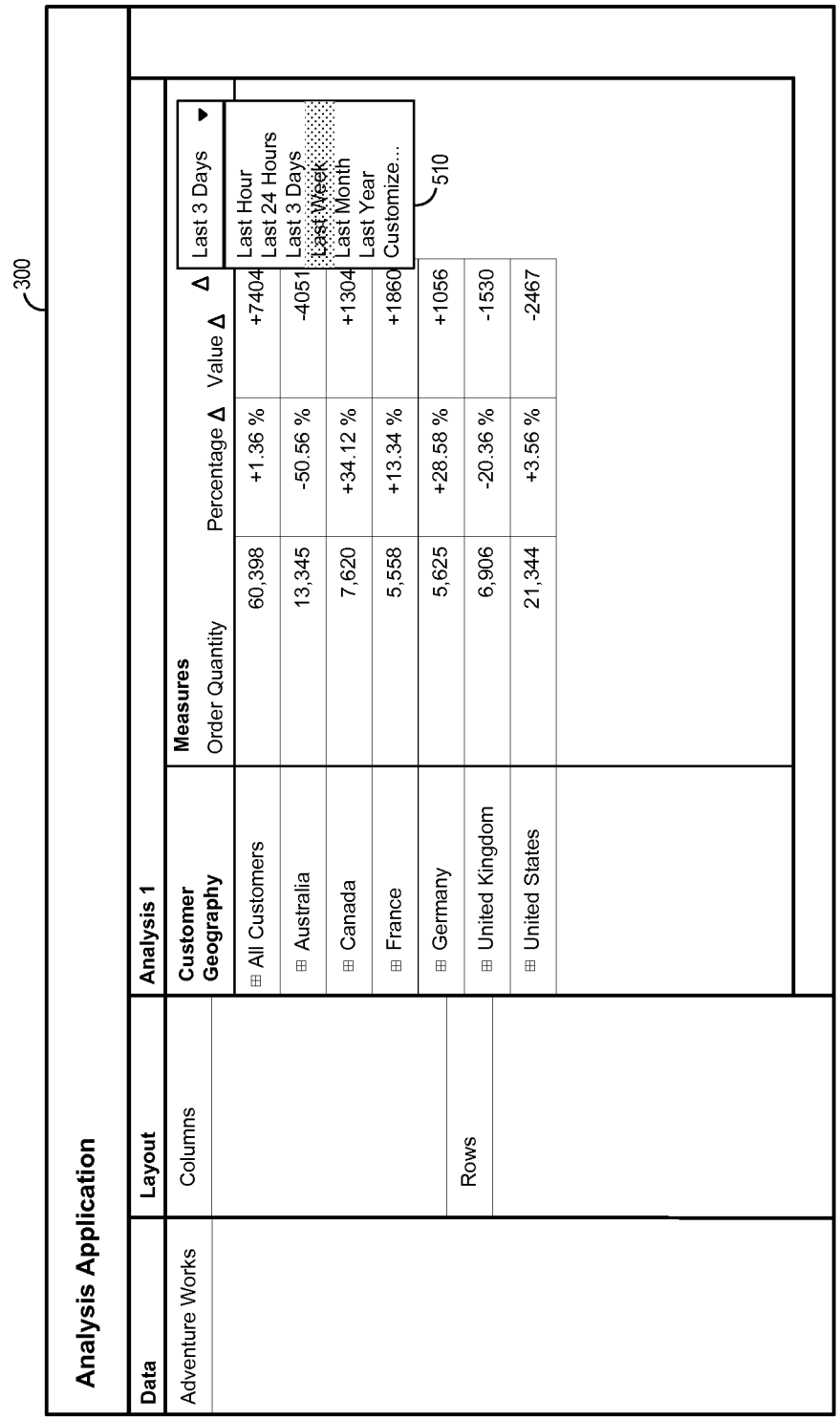
FIG. 9 is a view of a user interface according to some embodiments.

A query is then automatically generated at S220 to produce a value of Value Change measure 440 for each of the combinations of dimension members (i.e., rows) of the selected cells. Assuming the same OLAP cube and dates as the previous example, the generated query may consist of the following:

WITH MEMBER delta AS
    ([Measures].[Internet Order Quantity], [Date].[Fiscal].[Date].&[977])-([Measures].[Internet Order Quantity], [Date].[Fiscal].[Date].&[976])
SELECT
    {[Measures].[Internet Order Quantity], delta} ON 0, DrilldownLevel([Customer].[Customer Geography]) ON 1
FROM [Adventure Works];

FIG. 8 illustrates presentation of the values resulting from such a query in column 800 at S230. FIGS. 9 and 10 further depict manipulation of menu 510 to affect the values displayed in both of columns 500 and 800.

Specifically, as shown in FIG. 9, the user chooses "Last Week" from the options presented by menu 510. This choice results in generation at S220 of a new query for the Percentage Change measure and a new query for the Value Change measure. Consequently, new values for each row are calculated for each measure. FIG. 10 illustrates the resulting presentation of the new values according to some embodiments.

Figure 11:
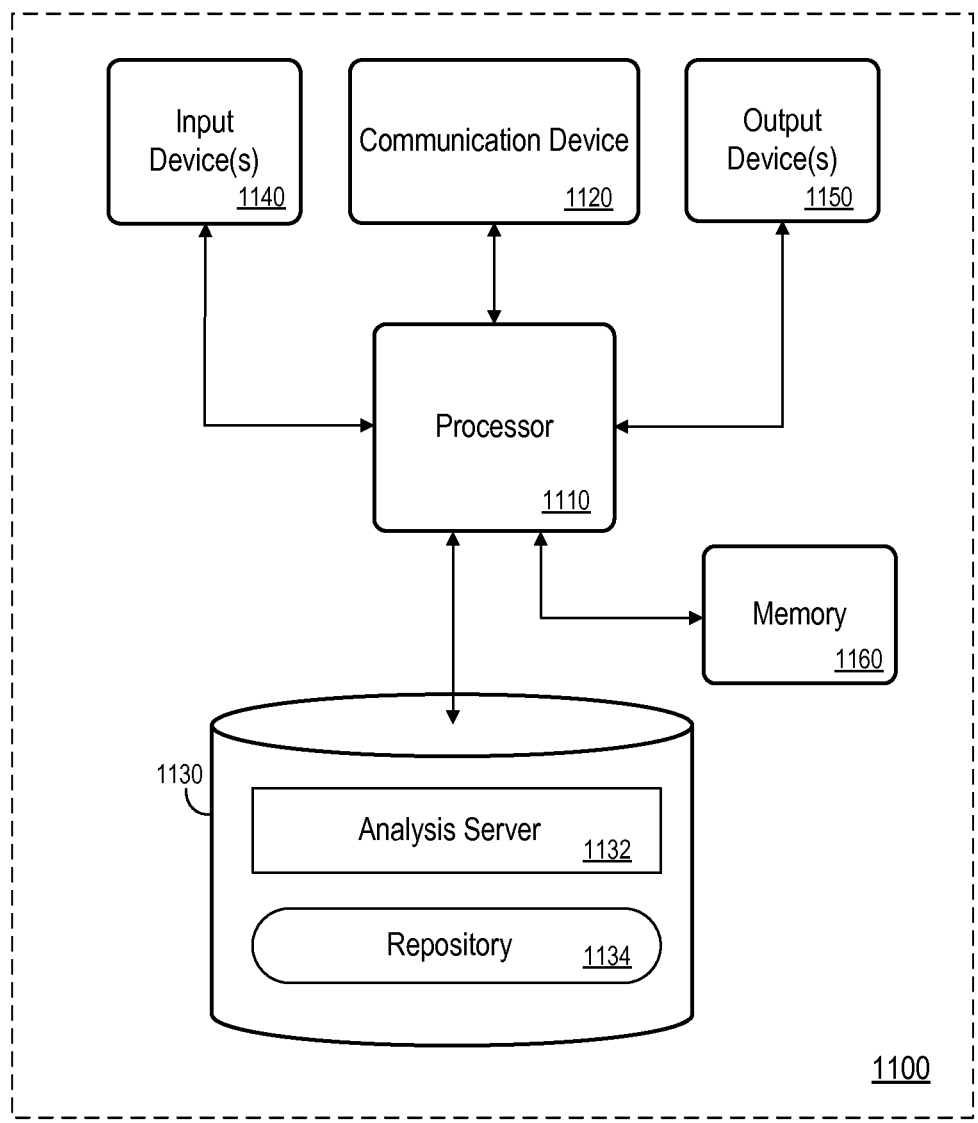
FIG. 11 is a block diagram of a computing device according to some embodiments.

Although embodiments are not limited to the examples of sub-menu 420 or the queries shown herein, the following are examples of queries that may be automatically generated at S220 in response to user selection of the Max/Min and Trends calculated measures, respectively, again assuming the same OLAP cube and dates as the previous examples:

Max/Min
WITH
MEMBER max_val AS
    MAX([Date].[Fiscal].[Month].&[2004]&[3].Children, [Measures].[Internet Order Quantity])
MEMBER min_val AS
    MIN([Date].[Fiscal].[Month].&[2004]&[3].Children, [Measures].[Internet Order Quantity])
SELECT
    {[Measures].[Internet Order Quantity], max_val, min_val} ON 0,
    DrilldownLevel([Customer].[Customer Geography]) ON 1
FROM [Adventure Works];

Trends
WITH MEMBER slope AS
    LinRegSlope(
    [Date].[Fiscal].[Month].&[2004]&[3].Children,
    [Measures].[Internet Order Quantity],
    Count([Date].[Fiscal].[Month].&[2004]&[3].FirstChild: [Date].[Fiscal].CurrentMem ber)),
    FORMAT_STRING="0.000"
SELECT
    {[Measures].[Internet Order Quantity], slope} ON 0, DrilldownLevel([Customer].[Customer Geography]) ON 1
FROM [Adventure Works];

FIG. 11 is a block diagram of apparatus 1100 according to some embodiments. Apparatus 1100 may comprise a general-purpose computing apparatus and may execute program code to perform any of the functions described herein. Apparatus 1100 may comprise an implementation of one or more elements of system 100, such as analysis server 110 and data source 120. Apparatus 1100 may include other unshown elements according to some embodiments.

Apparatus 1100 includes processor 1110 operatively coupled to communication device 1120, data storage device 1130, one or more input devices 1140, one or more output devices 1150 and memory 1160. Communication device 1120 may facilitate communication with external devices. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into apparatus 1100. Output device(s) 1150 may comprise, for example, a display (e.g., a display screen), a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM).

Analysis server 1132 of data storage device 1130 may comprise program code executable by processor 1110 to provide any of the functions described herein, including but not limited to process 200. Embodiments are not limited to execution of these functions by a single apparatus. Data source 1134 may store associated dimension members and measure values as described herein. Memory 1160 may also or alternatively store data of data source 120, with data storage device 1130 providing a persistent backup. Data storage device 1130 may also store data and other program code for providing additional functionality and/or which are necessary for operation thereof, such as device drivers, operating system files, etc.

Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A method implemented by a computing system in response to execution of program code by a processor of the computing system, the method comprising:
   receiving, from a user, a selection of a set of one or more elements of a data visualization, the set associated with a measure and each of the one or more elements associated with a value of the measure for a respective combination of one or more dimension members;
   receiving, from the user, an instruction to create a second set of one or more elements associated with a calculated measure, where a value of the calculated measure for a respective combination of one or more dimension members is based on two values of the measure for the respective combination of one or more dimension members, and where a first value of the two values of the measure is associated with a first time and a second value of the two values of the measure is associated with a second time;
   in response to the instruction, automatically generating a query to produce a value of the calculated measure for each of the combinations of one or more dimension members; and
   presenting the second set of one or more elements including the value of the calculated measure for each of the combinations of one or more dimension members.

2. A method according to claim 1, the method further comprising:
   receiving, from the user, a second instruction to create a third set of one or more elements associated with a second calculated measure, where the second calculated measure for a respective combination of one or more dimension members is based on the first value and the second value;
   in response to the second instruction, automatically generating a second query to produce a value of the second calculated measure for each of the combinations of one or more dimension members; and
   presenting the third set of one or more elements including the value of the second calculated measure for each of the combinations of one or more dimension members.

3. A method according to claim 2, the method further comprising:
   receiving, from the user, a third instruction to change the second time to a third time;
   in response to the third instruction:
   automatically generating a third query to produce a second value of the calculated measure for each of the combinations of one or more dimension members, where the second value of the calculated measure for a respective combination of one or more dimension members is based on the first value of the measure for the respective combination of one or more dimension members and on a third value of the measure for the respective combination of one or more dimension members, and where the third value is associated with the third time; and
   automatically generating a fourth query to produce a second value of the second calculated measure for each of the combinations of one or more dimension members, where the second value of the second calculated measure for a respective combination of one or more dimension members is based on the first value and the third value; and
   presenting the second set of one or more elements including the second value of the calculated measure for each of the combinations of one or more dimension members; and
   presenting the third set of one or more elements including the second value of the second calculated measure for each of the combinations of one or more dimension members.

4. A method according to claim 1, the method further comprising:
   receiving, from the user, a second instruction to change the second time to a third time;
   in response to the second instruction, automatically generating a second query to produce a second value of the calculated measure for each of the combinations of one or more dimension members, where the second value of the calculated measure for a respective combination of one or more dimension members is based on the first value of the measure for the respective combination of one or more dimension members and on a third value of the measure for the respective combination of one or more dimension members, and where the third value is associated with the third time; and
   presenting the second set of one or more elements including the second value of the calculated measure for each of the combinations of one or more dimension members.

5. A method according to claim 1, wherein automatically generating the query comprises:
   generating a multi-dimensional language query; and
   providing the multi-dimensional language query to a multi-dimensional data source.

6. A method according to claim 1, wherein automatically generating the query comprises:
   generating the query specifying the measure, the first time and the second time; and
   providing the query to a data source.

7. A non-transitory medium storing processor-executable program code, the program code executable by a processor of a computing device to:
   receive, from a user, a selection of a set of one or more elements of a data visualization, the set associated with a measure and each of the one or more elements associated with a value of the measure for a respective combination of one or more dimension members;

receive, from the user, an instruction to create a second set of one or more elements associated with a calculated measure, where a value of the calculated measure for a respective combination of one or more dimension members is based on two values of the measure for the respective combination of one or more dimension members, and where a first value of the two values of the measure is associated with a first time and a second value of the two values of the measure is associated with a second time;

in response to the instruction, automatically generate a query to produce a value of the calculated measure for each of the combinations of one or more dimension members; and present the second set of one or more elements including the value of the calculated measure for each of the combinations of one or more dimension members.

8. A medium according to claim 7, the program code further executable by a processor of a computing device to:

receive, from the user, a second instruction to create a third set of one or more elements associated with a second calculated measure, where the second calculated measure for a respective combination of one or more dimension members is based on the first value and the second value;

in response to the second instruction, automatically generate a second query to produce a value of the second calculated measure for each of the combinations of one or more dimension members; and present the third set of one or more elements including the value of the second calculated measure for each of the combinations of one or more dimension members.

9. A medium according to claim 8, the program code further executable by a processor of a computing device to:

receive, from the user, a third instruction to change the second time to a third time;

in response to the third instruction:

automatically generate a third query to produce a second value of the calculated measure for each of the combinations of one or more dimension members, where the second value of the calculated measure for a respective combination of one or more dimension members is based on the first value of the measure for the respective combination of one or more dimension members and on a third value of the measure for the respective combination of one or more dimension members, and where the third value is associated with the third time; and automatically generate a fourth query to produce a second value of the second calculated measure for each of the combinations of one or more dimension members, where the second value of the second calculated measure for a respective combination of one or more dimension members is based on the first value and the third value; and present the second set of one or more elements including the second value of the calculated measure for each of the combinations of one or more dimension members; and present the third set of one or more elements including the second value of the second calculated measure for each of the combinations of one or more dimension members.

10. A medium according to claim 7, the program code further executable by a processor of a computing device to:

receive, from the user, a second instruction to change the second time to a third time;

in response to the second instruction, automatically generate a second query to produce a second value of the calculated measure for each of the combinations of one or more dimension members, where the second value of the calculated measure for a respective combination of one or more dimension members is based on the first value of the measure for the respective combination of one or more dimension members and on a third value of the measure for the respective combination of one or more dimension members, and where the third value is associated with the third time; and present the second set of one or more elements including the second value of the calculated measure for each of the combinations of one or more dimension members.

11. A medium according to claim 7, wherein automatic generation of the query comprises:

generation of a multi-dimensional language query; and provision of the multi-dimensional language query to a multi-dimensional data source.

12. A medium according to claim 7, wherein automatic generation of the query comprises:

generation of the query specifying the measure, the first time and the second time; and provision of the query to a data source.

13. A system comprising:

a computing device comprising:

a memory storing processor-executable program code; and a processor to execute the processor-executable program code in order to cause the computing device to:

receive, from a user, a selection of a set of one or more elements of a data visualization, the set associated with a measure and each of the one or more elements associated with a value of the measure for a respective combination of one or more dimension members;

receive, from the user, an instruction to create a second set of one or more elements associated with a calculated measure, where a value of the calculated measure for a respective combination of one or more dimension members is based on two values of the measure for the respective combination of one or more dimension members, and where a first value of the two values of the measure is associated with a first time and a second value of the two values of the measure is associated with a second time;

in response to the instruction, automatically generate a query to produce a value of the calculated measure for each of the combinations of one or more dimension members; and present the second set of one or more elements including the value of the calculated measure for each of the combinations of one or more dimension members.

14. A system according to claim 13, the processor to further execute the processor-executable program code in order to cause the computing device to:

receive, from the user, a second instruction to create a third set of one or more elements associated with a second calculated measure, where the second calculated measure for a respective combination of one or more dimension members is based on the first value and the second value;

in response to the second instruction, automatically generate a second query to produce a value of the second calculated measure for each of the combinations of one or more dimension members; and present the third set of one or more elements including the value of the second calculated measure for each of the combinations of one or more dimension members.

15. A system according to claim 14, the processor to further execute the processor-executable program code in order to cause the computing device to:
- receive, from the user, a third instruction to change the second time to a third time;
- in response to the third instruction:
- automatically generate a third query to produce a second value of the calculated measure for each of the combinations of one or more dimension members, where the second value of the calculated measure for a respective combination of one or more dimension members is based on the first value of the measure for the respective combination of one or more dimension members and on a third value of the measure for the respective combination of one or more dimension members, and where the third value is associated with the third time; and
- automatically generate a fourth query to produce a second value of the second calculated measure for each of the combinations of one or more dimension members, where the second value of the second calculated measure for a respective combination of one or more dimension members is based on the first value and the third value; and
- present the second set of one or more elements including the second value of the calculated measure for each of the combinations of one or more dimension members; and
- present the third set of one or more elements including the second value of the second calculated measure for each of the combinations of one or more dimension members.

16. A system according to claim 13, the processor to further execute the processor-executable program code in order to cause the computing device to:
- receive, from the user, a second instruction to change the second time to a third time;
- in response to the second instruction, automatically generate a second query to produce a second value of the calculated measure for each of the combinations of one or more dimension members, where the second value of the calculated measure for a respective combination of one or more dimension members is based on the first value of the measure for the respective combination of one or more dimension members and on a third value of the measure for the respective combination of one or more dimension members, and where the third value is associated with the third time; and
- present the second set of one or more elements including the second value of the calculated measure for each of the combinations of one or more dimension members.

17. A system according to claim 13, wherein automatic generation of the query comprises:
- generation of a multi-dimensional language query; and
- provision of the multi-dimensional language query to a multi-dimensional data source.

18. A system according to claim 13, wherein automatic generation of the query comprises:
- generation of the query specifying the measure, the first time and the second time; and
- provision of the query to a data source.

* * * * *